Aug. 28, 1951     C. V. BRADY ET AL     2,565,754
BAG OF OPEN-MESH MATERIAL AND PAPER
Filed Oct. 9, 1948     5 Sheets-Sheet 1
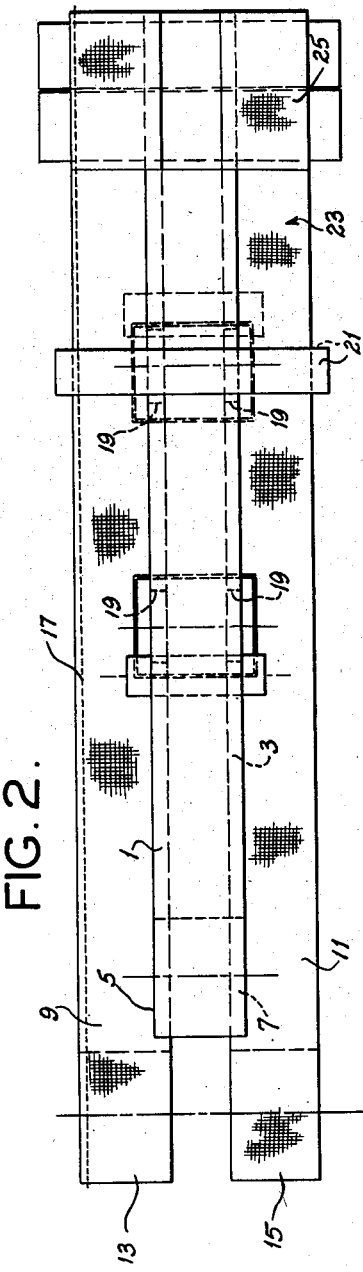
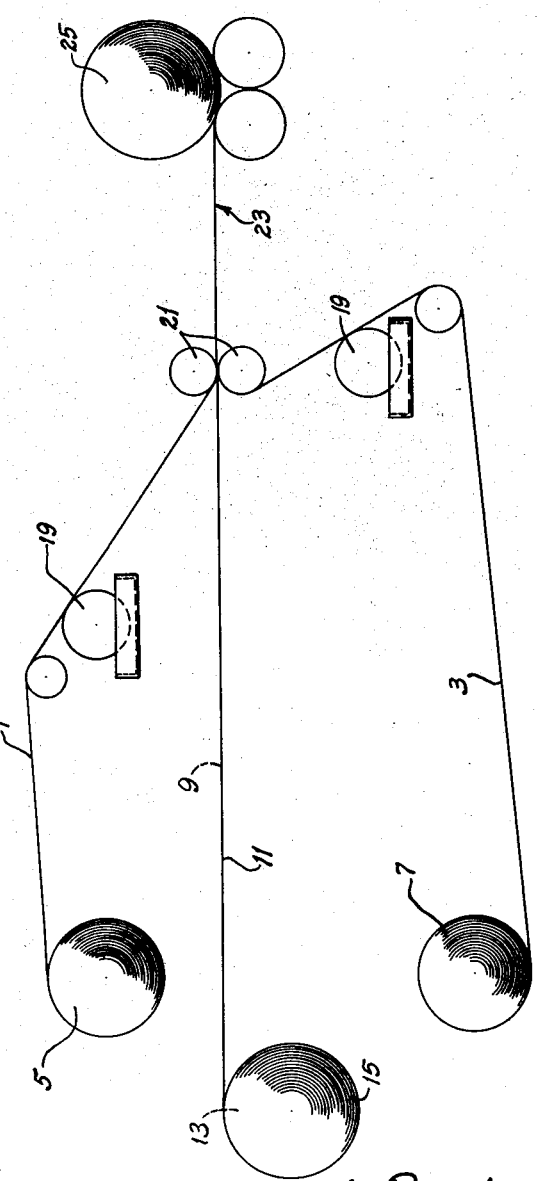

Aug. 28, 1951  C. V. BRADY ET AL  2,565,754
BAG OF OPEN-MESH MATERIAL AND PAPER
Filed Oct. 9, 1948  5 Sheets-Sheet 2
FIG. 3.
FIG. 4.
FIG. 6.
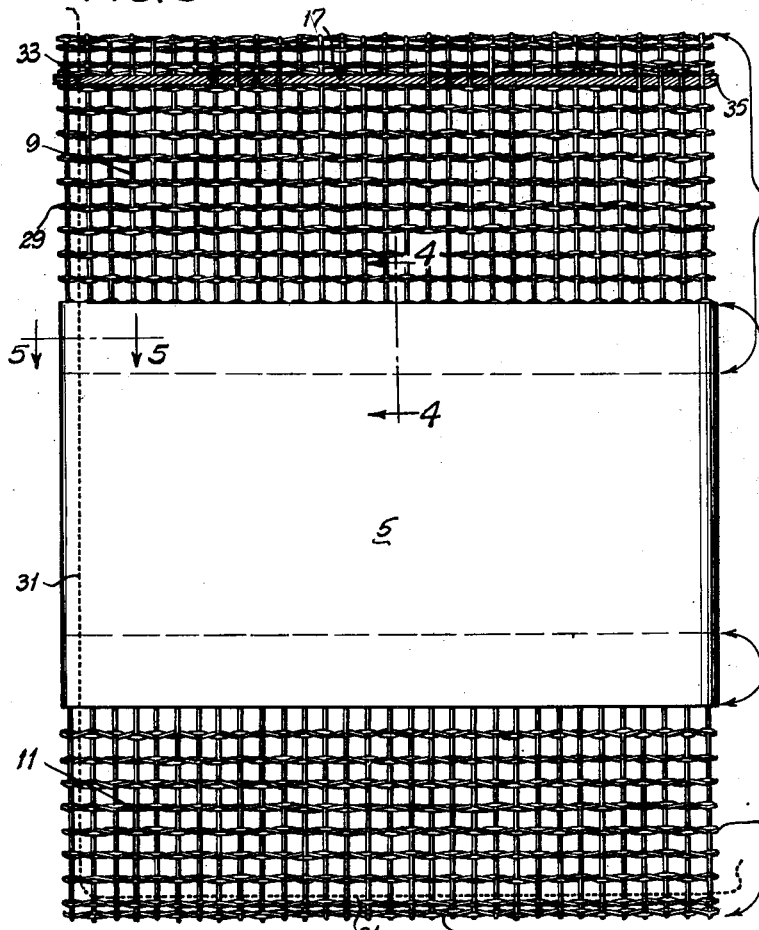
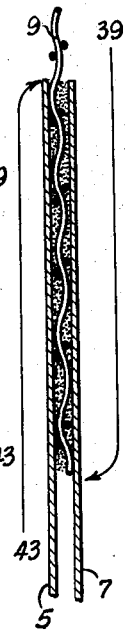
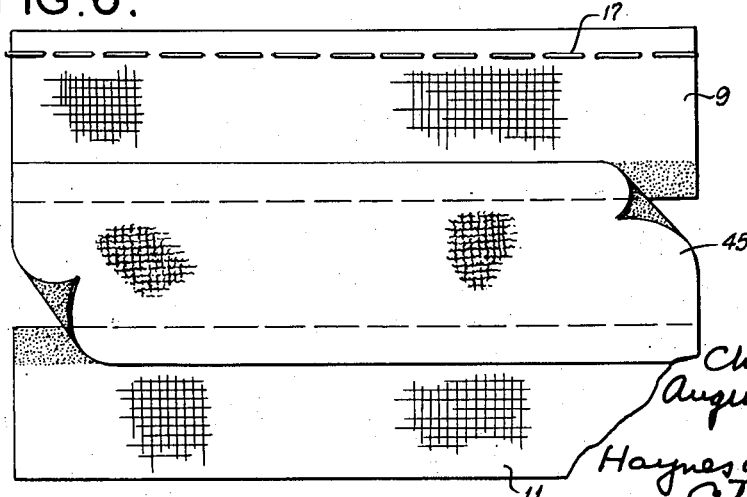
Charles V. Brady,
August F. Ottinger,
Inventors.
Haynes and Koenig
Attorneys.

Aug. 28, 1951 — C. V. BRADY ET AL — 2,565,754
BAG OF OPEN-MESH MATERIAL AND PAPER
Filed Oct. 9, 1948 — 5 Sheets-Sheet 3

Charles V. Brady,
August F. Ottinger,
Inventors.
Haynes and Hoenig
Attorneys.

Aug. 28, 1951　　　C. V. BRADY ET AL　　　2,565,754
BAG OF OPEN-MESH MATERIAL AND PAPER
Filed Oct. 9, 1948　　　　　　　　　　　　　5 Sheets-Sheet 4

Charles V. Brady,
August F. Ottinger,
Inventors.
Haynes and Koenig
Attorneys.

Aug. 28, 1951  C. V. BRADY ET AL  2,565,754
BAG OF OPEN-MESH MATERIAL AND PAPER
Filed Oct. 9, 1948  5 Sheets-Sheet 5

Charles V. Brady,
August F. Ottinger,
Inventors.
Haynes and Koenig.
Attorneys.

Patented Aug. 28, 1951

2,565,754

UNITED STATES PATENT OFFICE 2,565,754

BAG OF OPEN-MESH MATERIAL AND PAPER

Charles V. Brady and August F. Ottinger, St. Louis, Mo., assignors to Bemis Bro. Bag Company, St. Louis, Mo., a corporation of Missouri Application October 9, 1948, Serial No. 53,708

4 Claims. (Cl. 229—53)

This invention relates to bags of open-mesh material and paper, and with regard to certain more specific features, to ventilated bags of this class.

Among the several objects of the invention may be noted the provision of an improved ventilated bag of the class described having a relatively large area of imperforate material suitable for printing labels on the bag; the provision of a bag of the class described which has excellent strength and which provides for excellent visibility of products carried therein; the provision of a bag of this class which may be formed in part of open-mesh fabric adapted to incorporate a woven-in draw cord and the provision of a bag such as described which may be manufactured at high speed and low cost. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention are illustrated, Fig. 1 is a diagrammatic side elevation illustrating a method of manufacturing a web assembly;

Fig. 2 is a plan view of Fig. 1;

Fig. 3 is a plan view of a bag embodying the invention made from a web assembled according to Figs. 1 and 2;

Fig. 4 is a fragmentary enlarged vertical section taken on line 4—4 of Fig. 3;

Fig. 6 is a plan view of a modified blank, parts being peeled back;

Similar reference characters indicate corresponding parts throughout the several views of the drawings.

Figure 7:
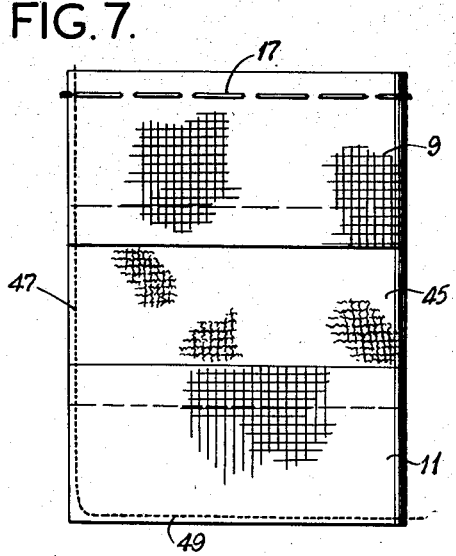
Fig. 7 is a plan view of an unturned bag made from the blank of Fig. 6.

Referring now more particularly to Figs. 1 and 2, two aligned superposed webs 1 and 3 of imperforate material such as paper are drawn from supply rolls 5 and 7 and combined at their opposite margins wtih transversely spaced-apart webs 9 and 11 of perforate material such as open-mesh fabric drawn from supply rolls 13 and 15. The paper may be of any suitable variety, such as kraft paper or, if desired, creped paper. The fabric may be of any open-mesh variety such as is ordinarily used in bag manufacture, for example a leno or a plain weave. One of the fabric webs 9 has a draw cord 17 woven therein. The paper webs 1 and 3 travel over marginal paster rollers 19 which apply adhesive to their opposed margins. At 21 is shown a set of combining rolls where the open-mesh fabric webs are adhered to opposite margins of the paper webs to form a composite web 23 consisting of a central two-ply paper strip having strips of open-mesh fabric adhered to its opposite margins, with one layer of the paper adhered to one side of the fabric strips and the other layer of paper adhered to the other side of the fabric strips in such manner that the inner margins of the fabric strips are sandwiched between the margins of the two plies of paper. As shown in Figs. 1 and 2, the composite web is wound into a roll 25, the winding serving to draw all the webs from their respective supply rolls and through the pasting and combining means.

Figure 5:
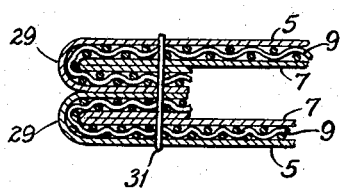
Fig. 5 is a fragmentary enlarged horizontal section taken on line 5—5 of Fig. 3.

The resultant composite web is severed along transverse lines spaced apart twice the width of the bag which is to be formed to provide bag blanks each of which consists of a two-ply paper strip flanked by strips of open-mesh fabric. To form a bag, a blank is folded along its transverse center line T, as shown in Fig. 3, to have its marginal edges substantially coincident. The fold defines one side margin, the two coincident edges 27 extending from one end of the fold define the bottom, and the two coincident edges 29 opposite the fold define the opposite side margin of a flat bag of generally rectangular outline. The edges 27 and 29 are seamed as by stitching 31 to form the bag bottom and one of the bag sides. Seaming may be accomplished with or without turning the edges under. However, it is preferable that the edges be turned under, as shown in Fig. 5. Such turning under provides for a better anchor between the stitching 31 of the side seam and the open-mesh weave of the fabric. In addition, such turning under aids the anchoring which is desired at 33 between the ends of the draw cord 17, so that the opposite portion 35 of the draw cord may now be pulled for closing the bag mouth. Such turning under also forms a finished bag without the necessity of turning it inside out.

The resulting bag comprises upper and lower sections or girthwise bands 39 and 41 of open-mesh fabric and an intermediate section or girthwise band 43 of paper, the bands being adhesively joined endwise. The inner ends of the two fabric bands 39 and 41 are sandwiched between the opposite ends of the two-ply paper band (see Fig. 4, for example). The upper band 39 defines the mouth of the bag and forms a ventilating panel. The lower band 41 is closed at its lower end (by stitching 31) and forms the bottom of the bag and another ventilating panel. The plies of paper of the intermediate band are not adhered, except at its ends, and the result is a strong yet flexible bag.

It is clear that if desired, one or the other of the layers of the paper section 43 may be eliminated by eliminating an appropriate one of the webs 1 or 3 in Figs. 1 and 2. In such event, it is preferable that the paper web retained shall finally be located on the outside of the adjacent margins of the fabric sections 39 and 41, for best appearance. This point is illustrated below in connection with another form of the invention.

Figure 8:
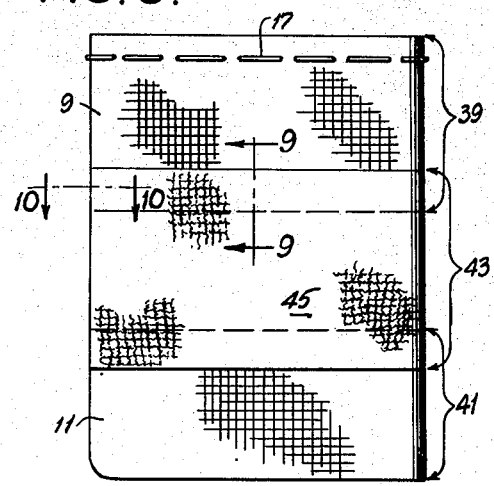
Fig. 8 is a plan view of a turned and finished bag made from the blank of Fig. 6.
Figure 9:
Fig. 9 is an enlarged fragmentary vertical section taken on line 9—9 of Fig. 8.
Figure 10:
Fig. 10 is an enlarged fragmentary horizontal section taken on line 10—10 of Fig. 8.

In Fig. 6 is shown a form of the invention employing a single layer of paper for the intermediate section or band of paper which joins the end bands of open-mesh fabric. The open-mesh webs 9 and 11 are as above stated. In this case they are joined by a single-ply web 45 of preferably creped paper, which makes this web pliable. Then the blank shown in Fig. 6 is folded over upon itself with the web 45 inside, as illustrated in Fig. 7. The seams 47 and 49, illustrated as stitched seams, are then applied. After this, the bag may be turned inside out, as shown in Fig. 8, which places the single-ply central paper web 45 outside (note also Figs. 9 and 10). The web 45, being made of creped paper, lends itself to proper turning of the bag. At the same time, this web is quite strong to resist internal forces from material later contained in the bag. It will be understood that inner and outer multi-ply creped layers may be used and the bag seamed inside out and subsequently turned; or the bag may be made outside out with the seams turned in during seaming.

Figure 11:
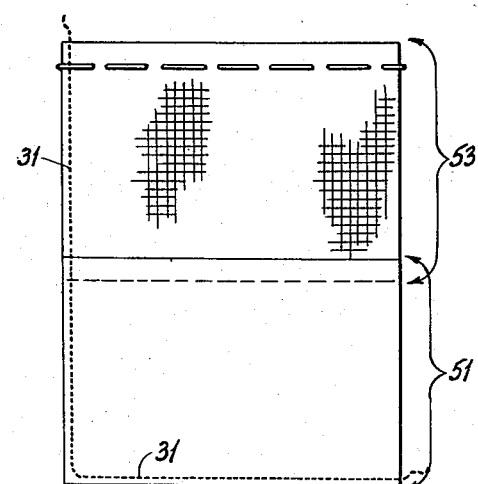
Fig. 11 is a plan view of a finished bag illustrating an alternative form of a bag.

In Fig. 11 is shown a form of the invention in which there is a paper section or band 51 forming the lower end of the bag entirely, and only one section or band 53 of open-mesh fabric forming the upper end of the bag. The paper section 51 may be composed of single-ply or multi-ply paper of the creped or uncreped variety, adhesively attached to the fabric section 53. In Fig. 11 a bag having a single lower paper section and a single upper open-mesh fabric section is shown, wherein a turned-in seam is employed (as in Fig. 5), rather than a seam which becomes inside of the bag by turning the bag inside out (as in Fig. 8).

The above-described bag constructions have several advantages over prior ventilated bags. For example, they have an advantage over other essentially paper bags with open-mesh window inserts. This is because the provision of a complete peripheral tubular section or band of open-mesh material enhances strength. In addition, the use of such a tubular section of open-mesh material at the top of the bag with the woven-in draw cord facilitates the provision of said draw cord. In addition, the draw cord is not required to pucker any paper, but merely puckers open-mesh fabric. Also, the peripheral tubular band of paper provides an economical label-forming area.

Figure 13:
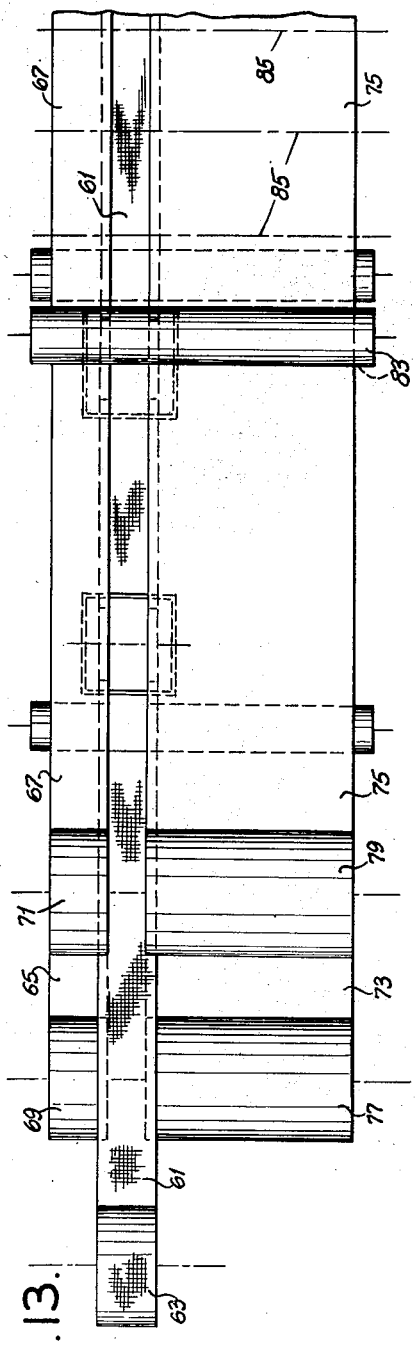
Fig. 13 is a plan view of Fig. 12.
Figure 12:
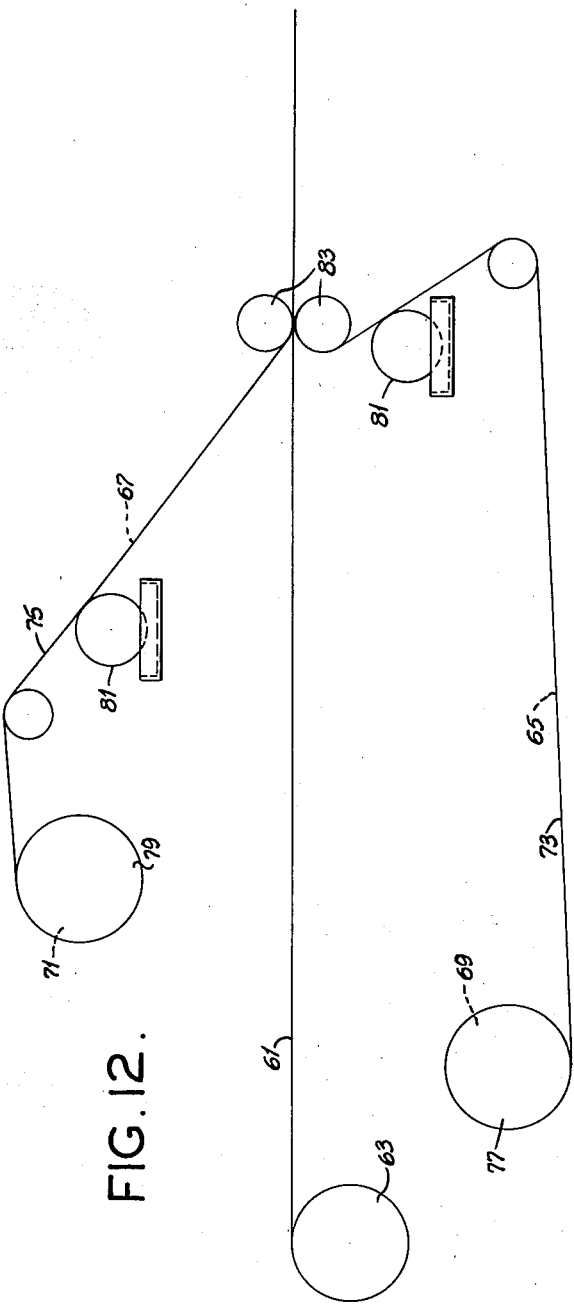
Fig. 12 is a diagrammatic side elevation illustrating a method of manufacturing a web assembly for use in making a further form of a bag.

Figs. 12 and 13 diagrammatically illustrate another mode of forming a composite web of paper and open-mesh fabric for use in making an alternative type of ventilated bag. As shown, a web of open-mesh fabric 61 is drawn from a supply roll 63 and combined at one margin with a pair of paper webs 65 and 67 drawn from supply rolls 69 and 71 and at its other margin with another pair of paper webs 73 and 75 drawn from supply rolls 77 and 79. The paper webs 73 and 75 are several times wider than the paper webs 65 and 67, the width of the latter as illustrated being of the order of the width of the open-mesh fabric web 61, though this is not essential. The paper webs 65, 67, 73 and 75 travel over paster rollers 81 which apply adhesive to their margins. At 83 is shown a set of combining rolls where the paper webs 65 and 67 are adhered to one margin of the open-mesh fabric web and the webs 73 and 75 are adhered to its opposite margin. The webs 65 and 73 are adhered to one side of the fabric, the webs 67 and 75 are adhered to the other.

Figure 14:
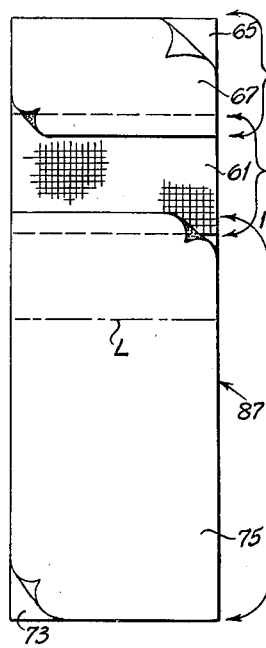
Fig. 14 is a plan view of blank made from the web assembly illustrated in Figs. 12 and 13.

The resultant composite web is severed along transverse lines 85 spaced apart a distance corresponding to the desired bag width as shown in Fig. 13 to obtain the blanks 87 shown in Fig. 14. Each blank comprises a strip 89 of the open-mesh fabric 61 having sections 91 and 93 of paper adhesively secured to the two opposite lengthwise margins thereof. Each section 91 and 93 comprises two layers of paper adhered to the opposite sides of the fabric strip at its margin. Section 91 includes segments of the two paper webs 65 and 67, section 93 includes segments of the other two paper webs 73 and 75. The dimension of the section 93 transverse to the length of the fabric strip, which is referred to as its width, is considerably greater than the corresponding dimension or width of section 91. Preferably, the width of section 93 is such that when the blank 87 is folded over upon its longitudinal center line L, the fabric strip is located substantially centrally of the folded blank.

To form a bag from the blank 87, it is doubled or folded over on its longitudinal center line L to have its marginal edges substantially coincident. The fold defines the bottom and the coincident edges extending from the fold define the side margins of a flat bag of generally rectangular outline. These edges are seamed in any suitable way, as by being folded over and stitched together as indicated at 95 in Figs. 15 and 16. The coincident edges of the blank opposite the fold are not seamed and define the mouth 97 of the bag. In the resultant bag, the fabric strip extends girthwise from one side seam 95 to the other and forms a ventilating panel located substantially centrally of a wall of the bag. The panel is in effect framed by the side seams and thus presents a neat appearance.

Figure 15:
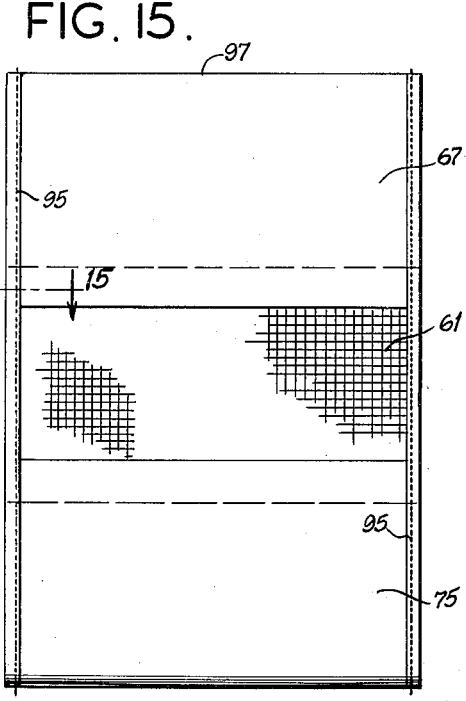
Fig. 15 is an enlarged plan view of a bag made from the blank of Fig. 14.
Figure 16:
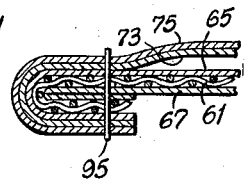
Fig. 16 is a fragmentary enlarged horizontal section through a side seam of the bag of Fig. 15, being taken on line 15—15 of Fig. 15.
Figure 17:
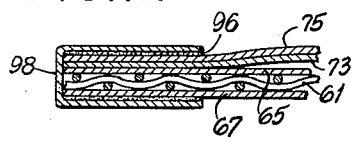
Figs. 17–19 are sections similar to Fig. 16 but illustrating different seams that may be used.
Figure 18:
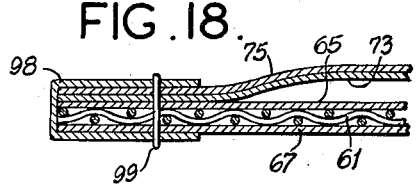
Figure 19:
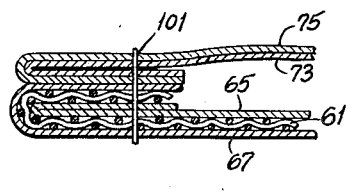

Figs. 17-19 illustrate alternate modes of forming the side seams for the bag of Fig. 15. In Fig. 17, there is shown a side seam formed by folding a tape or cover strip 98 over the coincident edges of the bag blank and adhesively attaching it as shown at 96. Fig. 18 illustrates a seam similar to that of Fig. 17 with the exception that stitching 99 is used instead of adhesive. Fig. 19 illustrates an inturned stitched seam 101. It will also be understood that, instead of having a plain fold at the bottom of the bag, the bag may have a so-called V-bottom, or if desired a satchel bottom, as is common.

Thus, there is provided a ventilated bag having a relatively large area of imperforate material suitable for printing labels and a perforate panel or panels for visibility and for ventilating the bag contents. The above-described bags are economical to manufacture because they are formed in part of relatively inexpensive paper and thus require less of the relatively expensive open-mesh fabric than prior ventilated bags formed entirely of open-mesh fabric, and because of the simplicity of the process of manufacture.

Cross reference is made under rule 78 to our copending divisional application of the same title, Serial No. 214,794, filed March 9, 1951.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

We claim:

1. A bag comprising a section of open-mesh bag material in the form of a band forming the upper part of the bag body with the upper edge of said band defining the mouth of the bag, an intermediate section consisting of two plies of paper in the form of a band forming an intermediate part of the bag body below the upper band, the lower edge portion of the upper band being sandwiched between the upper edge portions of the paper plies and secured therein, and a bottom section of open-mesh bag material in the form of a band forming the lower part of the bag body and having its upper edge portion sandwiched between the lower edge portions of the paper plies and secured therein, and having its bottom closed to form the bag bottom.

2. A bag as set forth in claim 1 wherein the edge portions of the open-mesh sections sandwiched between the two paper plies are adhesively secured thereto.

3. A bag formed of a generally rectangular blank comprising an intermediate section consisting of two superimposed plies of paper extending the full width of the blank but only part of its height and two separate generally rectangular sections of open-mesh bag material each extending the full width of the blank but only part of its height, said sections being arranged with one widthwise marginal edge portion of one open-mesh section sandwiched between the paper plies at one widthwise marginal edge portion of said intermediate section and secured therein, and with one widthwise marginal edge portion of the other open-mesh section sandwiched between the paper plies at the other widthwise marginal edge portion of said intermediate section and secured therein, thereby uniting the sections to form the blank, the blank being folded upon a fold line which extends heightwise across both the open-mesh sections and the two-ply paper section to have the marginal edges of the blank substantially coincident, the coincident edges of the folded blank opposite the fold and at one end of the folded blank being seamed to form an open-mouthed bag having ventilating panels at its upper and lower ends formed by the open-mesh sections.

4. A bag as set forth in claim 3 wherein the marginal edge portions of the open-mesh sections sandwiched between the two paper plies are adhesively secured thereto.

CHARLES V. BRADY.
AUGUST F. OTTINGER.

REFERENCES CITED

The following references are of record in the file of this patent:

UNITED STATES PATENTS

| Number | Name | Date |
|---|---|---|
| 2,085,365 | Israel | June 29, 1937 |
| 2,410,282 | Frixione | Oct. 29, 1946 |
| 2,416,747 | Geimer | Mar. 4, 1947 |
| 2,428,266 | Daniels | Sept. 30, 1947 |
| 2,437,184 | Brady et al. | Mar. 2, 1948 |